United States Patent [19]

Kume

[11] Patent Number: 5,060,217

[45] Date of Patent: Oct. 22, 1991

[54] OPTICAL HEAD DEVICES FOR USE IN RECORDING AND/OR REPRODUCTION OF INFORMATION

[75] Inventor: Hidehiro Kume, Tokyo, Japan

[73] Assignee: Sony Corporation, Tokyo, Japan

[21] Appl. No.: 358,258

[22] Filed: May 30, 1989

[30] Foreign Application Priority Data

Jun. 16, 1988 [JP] Japan .................................. 1-149098

[51] Int. Cl.[5] ......................... G01N 21/88; G01J 1/20

[52] U.S. Cl. .............................. 369/44.41; 369/44.42; 369/120

[58] Field of Search .................... 369/44.41, 44.42, 32, 369/109, 120; 250/201.5, 203.2, 202

[56] References Cited

U.S. PATENT DOCUMENTS 4,654,838 3/1987 Sugiki .............................. 369/44.42
4,742,218 5/1988 Nakamura et al. .............. 369/44.42
4,750,162 6/1988 Tajima ............................. 369/44.41

FOREIGN PATENT DOCUMENTS 60-217535 4/1984 Japan ................................ 369/44.41
1-150243 12/1987 Japan ................................ 369/44.42

*Primary Examiner*—Roy N. Envall, Jr.
*Assistant Examiner*—Hindi Nabil
*Attorney, Agent, or Firm*—Lewis H. Eslinger; Jay H. Maioli

[57] ABSTRACT

An optical head device for use in recording and/or reproduction of information comprises a light beam generating portion, a lens element for causing a light beam obtained from the light beam generating portion to impinge upon a record medium and receiving the light beam from the recording medium, and a photodetecting portion to which the light beam from the record medium received by the lens element is guided and which has three photosensitive elements separated from each other by a couple of parallel dividing portions and disposed to form a common light receiving plane on which a beam spot is formed by the light beam guided to the photodetecting portion for detecting the light beam guided to the photodetecting portion to produce respective detection output signals from which a tracking error signal is produced, wherein each of the parallel dividing portions extends along a direction selected to be at an angle within an angle rqnge of 0 to 90 degrees to a direction of movement of a diffraction pattern appearing in the beam spot formed on the common light receiving plane in accordance with a record track in the record medium.

6 Claims, 6 Drawing Sheets

P
L
a
b
$D_1(D_1')$
$D_2(D_2')$
$D_3(D_3')$

P
L
a
b
$D_1(D_1')$
$D_2(D_2')$
$D_3(D_3')$

P
L
a
b
$D_1(D_1')$
$D_2(D_2')$
$D_3(D_3')$
$T_1$
$T_2$

OPTICAL HEAD DEVICES FOR USE IN RECORDING AND/OR REPRODUCTION OF INFORMATION

BACKGROUND OF THE INVENTION

1. Field of the Invention

The present invention relates generally to optical head devices for use in recording and/or reproduction of information, and more particularly, to an optical head device which causes a light beam to impinge upon a record medium and guides the light beam from the record medium to a photodetector for reproducing information recorded on the record medium and obtaining a tracking error signal used for maintaining the light beam incident upon the record medium in correct tracking relation to a record track formed in the record medium.

2. Description of the Prior Art

In an optical disc player for reproducing information recorded on an optical record disc, an optical head device is provided within an optical arrangement to read an information signal from a record track formed in he optical record disc by the use of a laser light beam impinging upon the record track. The optical head device is required to produce the laser light beam, to cause the laser light beam to be focused correctly on the record track, which is usually very narrow in width, so as to trace faithfully the same, and to guide properly a reflected laser light beam obtained from the optical record disc to a photodetector. For fulfilling these requirements, the optical head device comprises a precise arrangement of various optical components including a semiconductor laser for generating a laser light beam, an objective lens facing the optical record disc to focus the laser light beam incident upon the optical record disc and to receive the reflected laser light beam from the optical record disc, other lenses, mirrors, prisms, photosensitive elements constituting the photodetector and so on. These components are supported to be movable in both directions along an optical axis of the objective lens and perpendicular to the optical axis of the objective lens in order to maintain focus control so that the laser light beam incident upon the optical record disc remains in correct focus relation to the record track and to maintain tracking control, so that the laser light beam incident upon the optical record disc remains in correct tracking relation to the record track.

In the focus control performed in the optical head device, a focus error signal which varies in response to variations in the focus condition of the laser light beam incident upon the record track in the optical record disc is produced based on detection output signals obtained from the photodetector to which the reflected laser light beam from the optical disc is guided and the objective lens is moved along its optical axis in accordance with the focus error signal. Further, in the tracking control performed in the optical head device, a tracking error signal which varies in response to variations in the tracking condition of the laser light beam incident upon the record track in the optical record disc is produced based on the detection output signals obtained from the photodetector to which the reflected laser light beam from the optical disc is guided. The optical axis of the objective lens is centered onto the record track in accordance with the tracking error signal.

For producing the focusing and tracking error signals, the photodetector provided in the optical head device comprises, for example, four photosensitive elements $d_1$, $d_2$, $d_3$ and $d_4$ disposed close to one another, as illustrated in FIG. 1. The photosensitive elements $d_1$ to $d_4$ are so arranged that the photosensitive elements $d_1$ and $d_3$ are aligned along a direction X corresponding to the tangential direction of the record track in the optical record disc and the photosensitive elements $d_2$ and $d_4$ are also aligned along the direction X. The reflected laser light beam coming through the objective lens from the record track in the optical record disc forms a beam spot Q on the photosensitive elements $d_1$ to $d_4$ as indicated by a dot-dash line in FIG. 1. The photosensitive elements $d_1$ to $d_4$ produce respective detection output signals $S_1$, $S_2$, $S_3$ and $S_4$ each dependent on a portion of the beam spot Q formed on each of the photosensitive elements $d_1$ to $d_4$.

A reproduced information signal is produced by summing up the detection output signals $S_1$ to $S_4$, and the focus error signal is obtained based on a difference between an added signal obtained by adding the detection output signal $S_1$ to the detection output signal $S_4$ and an added signal obtained by adding the detection output signal $S_2$ to the detection output signal $S_3$, in the same manner as disclosed in, for example, U.S. Pat. No. 4,023,033 and U.S. Pat. No. 4,079,247.

The tracking error signal will now be considered. The record track in the optical record disc is composed of a series of pits having a depth which is a quarter of the wavelength $\lambda$ of the laser light beam incident upon the record track. The laser light beam irradiating the record track is diffracted and reflected by the pits. Then, the laser light beam which is modulated by the record track is reflected back through the objective lens as the reflected laser light beam and reaches the photodetector to form the beam spot Q on the photosensitive elements $d_1$ to $d_4$. Accordingly, the reflected light beam produces a diffraction pattern corresponding to the positional relationship between one of the pits forming the record track and a beam spot formed by the laser light beam irradiating the record track. The diffraction pattern thus produced is moved in a direction corresponding to the direction X in relation to the photosensitive elements $d_1$ to $d_4$ at speed corresponding to the movement of the record track relative to the laser light beam irradiating the record track.

FIGS. 2A, 2B and 2C illustrate the manner in which the foregoing process takes place. In each of FIGS. 2A to 2C, a designates positional relationships between a pit P and a beam spot L formed by the laser light beam irradiating the pit P, and b designates diffraction patterns (hatched portions) formed on an exit pupil surface of the objective lens by the reflected laser light beam in dependence on each of the positional relationships designated by a. Four quarters $d_1$, $d_2$, $d_3$ and $d_4$ shown at b indicate portions in which quantities of light are detected by the four photosensitive elements $d_1$, $d_2$, $d_3$ and $d_4$, respectively. The pit P moves from a position $t_1$ to a position $t_2$ in relation to the beam spot L. FIG. 2A shows a condition in which the beam spot L is displaced to the right in relation to the pit P. FIG. 2B illustrates a condition in which the beam spot L is positioned centrally on the pit P, namely, a correct tracking condition in which the laser light beam arrives properly at the record track in the optical record disc. FIG. 2C shows a condition in which the beam spot L is displaced to the left in relation to the pit P.

It is understood from FIGS. 2A to 2C that when the beam spot L is centrally positioned on the pit P, that is, when the laser light beam incident upon the record track is in the proper tracking condition, a diffraction pattern in which quantities of light are symmetrically distributed among another quarters $d_1$ and $d_2$ and among another quarters $d_3$ and $d_4$, is produced, and when the beam spot L is displaced rightward or leftward in relation to the pit P, a diffraction pattern is produced in which the distribution of the quantities of light among the quarters $d_1$ and $d_2$ and among the quarters $d_3$ and $d_4$, is asymmetric, with the light distribution out of symmetry in reversed patterns in the case where the beam pattern is disposed to the right and in the case where the beam pattern is disposed to the left, respectively. Based on the foregoing, the detection output signals $S_1$ to $S_4$ obtained from the photosensitive elements $d_1$ to $d_4$, respectively, may be supplied to and processed by a signal generating circuit for producing a signal which varies in dependence on the positional relationships between the beam spot L and the pit P, namely, the tracking error signal.

FIG. 3 shows one example of the signal generating circuit by which the tracking error signal is produced based on the detection output signals $S_1$ to $S_4$ obtained from the photosensitive elements $d_1$ to $d_4$, together with the reproduced output of an information signal recorded on the record medium, that is, a reproduced information signal.

In the circuit shown in FIG. 3, the detection output signals $S_1$ and $S_4$ obtained from the photosensitive elements $d_1$ and $d_4$, respectively are added to each other by an adder 11, and the detection output signals $S_2$ and $S_3$ obtained from the photosensitive elements $d_2$ and $d_3$, respectively, are added to each other by an adder 12. Output signals from the adders 11 and 12 are supplied to an adder 13 to produce an output signal $S_5$ and supplied also to a subtracter 14 to produce an output signal $S_6$. The output signal $S_5$ obtained from the adder 13 serves as the reproduced information signal, and the output signal $S_6$ obtained from the subtracter 14 comprises a signal residing in a frequency band of the information signal recorded on the record track in the optical record disc and varying whenever the beam spot L on the optical record disc passes through the pit P and serves as the tracking error signal which indicates deviations of the beam spot L from the center of the record track formed by the series of pits.

Further, in the circuit shown in FIG. 3, the output signal $S_5$ obtained from the adder 13 is supplied to pulse generators 15 and 16. The pulse generator 15 produces a pulse signal $S_7$ in response to each rising edge of the output signal $S_5$ and the pulse generator 16 produces a pulse signal $S_8$ in response to each falling edge of the output signal $S_5$. The output signal $S_6$ obtained from the subtracter 14 is supplied to sampling-hold circuits 17 and 18. In the sampling-hold circuit 17, the level of the output signal $S_6$ is sampled by the pulse signal $S_8$ and each level sampled by pulse signal $S_8$ is held to produce an output signal $S_9$. Similarly, in the sampling-hold circuit 18, the level of the output signal $S_6$ is sampled by the pulse signal $S_7$ and each level sampled by pulse signal $S_7$ is held to produce an output signal $S_{10}$. Each of the output signals $S_9$ and $S_{10}$ obtained from the sampling-hold circuits 17 and 18, respectively, has a polarity varying from negative to positive or vice versa when the beam spot L is moved to traverse the record track and a level representative of the deviations of the beam spot L from the center of the record track. Consequently, the output signals $S_9$ and $S_{10}$ can be employed as tracking control signals. These output signals $S_9$ and $S_{10}$ are supplied to a differential circuit 19 to produce a tracking control signal $S_{11}$ which is more reliable and is then delivered to an output terminal 20.

In the previously proposed optical head device as described above, wherein the tracking error signal is produced in such a manner as aforementioned, four photosensitive elements constituting the photodetector are required to be precisely arranged with respect to each other and with respect to the record track in the optical record disc. This, results in complicated configurations of the photodetector itself and of devices for positioning the photodetector. Further, a bidirectional optical arrangement is required to control movement of the reflected laser light beam in each of two directions perpendicular to each other and to thereby accurately position the reflected beam onto the photodetector.

Especially, in the case where the previously proposed optical head device is equipped with an integrated light beam generating and detecting unit which comprises a semiconductor substrate on which a photodetector, a semiconductor laser, and a prism for directing a laser light beam generated by the semiconductor laser to impinge upon an optical record disc and for guiding a reflected laser light beam obtained from the optical record disc to the photodetector are provided, as disclosed in the Japanese patent application published before examination under publication number 62-197931, the disadvantage resulting from the photodetector composed of four photosensitive elements which are provided for producing the tracking error signal as described above is more serious.

OBJECTS AND SUMMARY OF THE INVENTION

Accordingly, it is an object of the present invention to provide an optical head device for use in recording and/or reproduction of information, by which a light beam is caused to impinge upon a record medium and the light beam from the record medium is guided to a photodetecting portion so that detection output signals used for producing at least a reproduced signal of information recorded on the record medium and a tracking error signal are obtained from the photodetecting portion, and which avoids the aforementioned disadvantages and problems encountered with the prior art.

Another object of the present invention is to provide an optical head device for use in recording and/or reproduction of information, by which a light beam is caused to impinge upon a record medium and the light beam reflected from the record medium is guided to a photodetecting portion so that detection output signals used for producing at least a reproduced signal of information recorded on the record medium and a tracking error signal are obtained from the photodetecting portion, and which can further supply the detection output signals of the photodetecting portion from which a reliable tracking error signal is obtained under a condition wherein the photodetecting portion is simplified in configuration and the position on the photodetecting portion upon which the light beam from the record medium is incident need not be controlled in two directions perpendicular to each other.

A further object of the present invention is to provide an optical head device for use in recording and/or reproduction of information, by which a light beam reflected is caused to impinge upon a record medium and the light beam from the record medium is guided to a photodetecting portion so that detection output signals used for producing at least a reproduced signal of information recorded on the record medium and a tracking error signal are obtained from the photodetecting portion, and which can further supply the detection output signals of the photodetecting portion from which a reliable tracking error signal is obtained under a condition wherein the photodetecting portion is simplified in configuration and an exact bidirectional control for a position on the photodetecting portion upon which the light beam from the record medium is incident is not required even in the case where an integrated light beam generating and detecting unit is employed in the device.

According to the present invention, there is provided an optical head device for use in recording and/or reproduction of information, which comprises a light beam generating portion, a lens element for causing a light beam obtained from the light beam generating portion to impinge upon a record medium and for receiving the light beam from the recording medium, and a photodetecting portion to which the light beam from the record medium received by the lens element is guided and which has a group of photosensitive elements including a central and two side photosensitive elements separated from each other by a couple of parallel dividing portions each extending along a predetermined direction and disposed to form a common light receiving plane on which a beam spot is formed by the light beam guided to the photodetecting portion for detecting the light beam guided to the photodetecting portion to produce respective detection output signals which are of use in such a manner that the tracking error signal is produced based on the detection output signal from the central photosensitive element and an added signal obtained by adding the detection output signals from the side photosensitive elements to each other, wherein, in the photodetecting portion, the predetermined direction along which each of the parallel dividing portions extends is selected to be at an angle within an angle range of 0 to 90 degrees with respect to a direction of movement of a diffraction pattern appearing in the beam spot formed on the common light receiving plane in accordance with a record track in the record medium.

In one embodiment, the photodetecting portion has first and second groups of photosensitive elements each arranged in the same manner as the group described above, and the light beam guided to the photodetecting portion is caused to be incident upon each of the first and second groups successively with a focusing point thereof on an optical path formed between the first and second groups.

In the optical head device of there is provided present invention, since the group of photosensitive elements including three photosensitive elements separated from each other by two parallel dividing portions each extending the predetermined direction in the photodetecting portion, where the predetermined direction along which each of the parallel dividing portions extends is arranged to be at the angle within the angle range of 0 to 90 degrees with respect to the direction of movement of the diffraction pattern appearing in the beam spot formed on the group of photosensitive elements by the light beam from the record medium in accordance with the record track in the record medium, the diffraction pattern in the beam spot formed on the group of photosensitive elements varies in accordance with the positional relationship between the record track in the record medium and a beam spot formed on the record disc by the light beam impinging thereon in substantially the same manner as that shown in FIGS. 2A to 2C and described above.

Then, each of the central photosensitive elements and two side photosensitive elements produces the detection output signal in response to the portion of the light beam from the record medium received thereby and the tracking error signal is produced based on the detection output signal from the central photosensitive element and the added signal obtained by adding the detection output signals from the side photosensitive elements to each other.

In the optical head device according to the present invention thus arranged, the predetermined direction along which each of the parallel dividing portions extends in the photodetecting portion is not required to be arranged so exactly and a position on the group of photosensitive elements upon which the light beam guided to the photodetecting portion is incident is also not required to be controlled so exactly in the predetermined direction. Consequently, with the optical head device according to the present invention, a reliable tracking error signal is obtained under a condition wherein the photodetecting portion is simplified in configuration and an exact bidirectional control for a position on the photodetecting portion upon which the light beam from the record medium is incident is not required even in the case where an integrated light beam generating and detecting unit is employed in the optical head device.

Further, in the embodiment which is provided with the photodetecting portion having the first and second groups of photosensitive elements, the detection output signals from which a focus error signal is also produced, in addition to the reproduced signal of information recorded on the record medium and the tracking error signal, are obtained from the photodetecting portion.

The above, and other objects, features and advantages of the present invention will become apparent from the following detailed description which is to be read in conjunction with the accompanying drawings.

DESCRIPTION OF THE PREFERRED EMBODIMENTS

FIGS. 4 to 7 show one embodiment of optical head device for use in recording and/or reproduction of information according to the present invention. This embodiment shown in FIGS. 4 to 7 is, in actual use, incorporated in a disc player.

Figure 1:
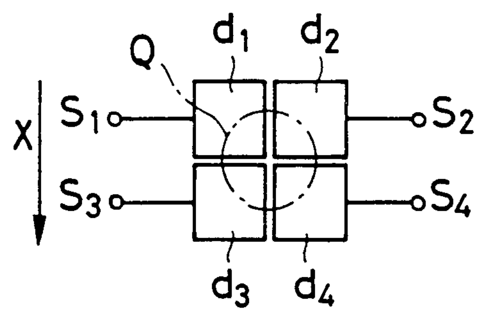
FIG. 1 is a schematic view showing a photodetector employed in a previously proposed optical head device.
Figure 3:
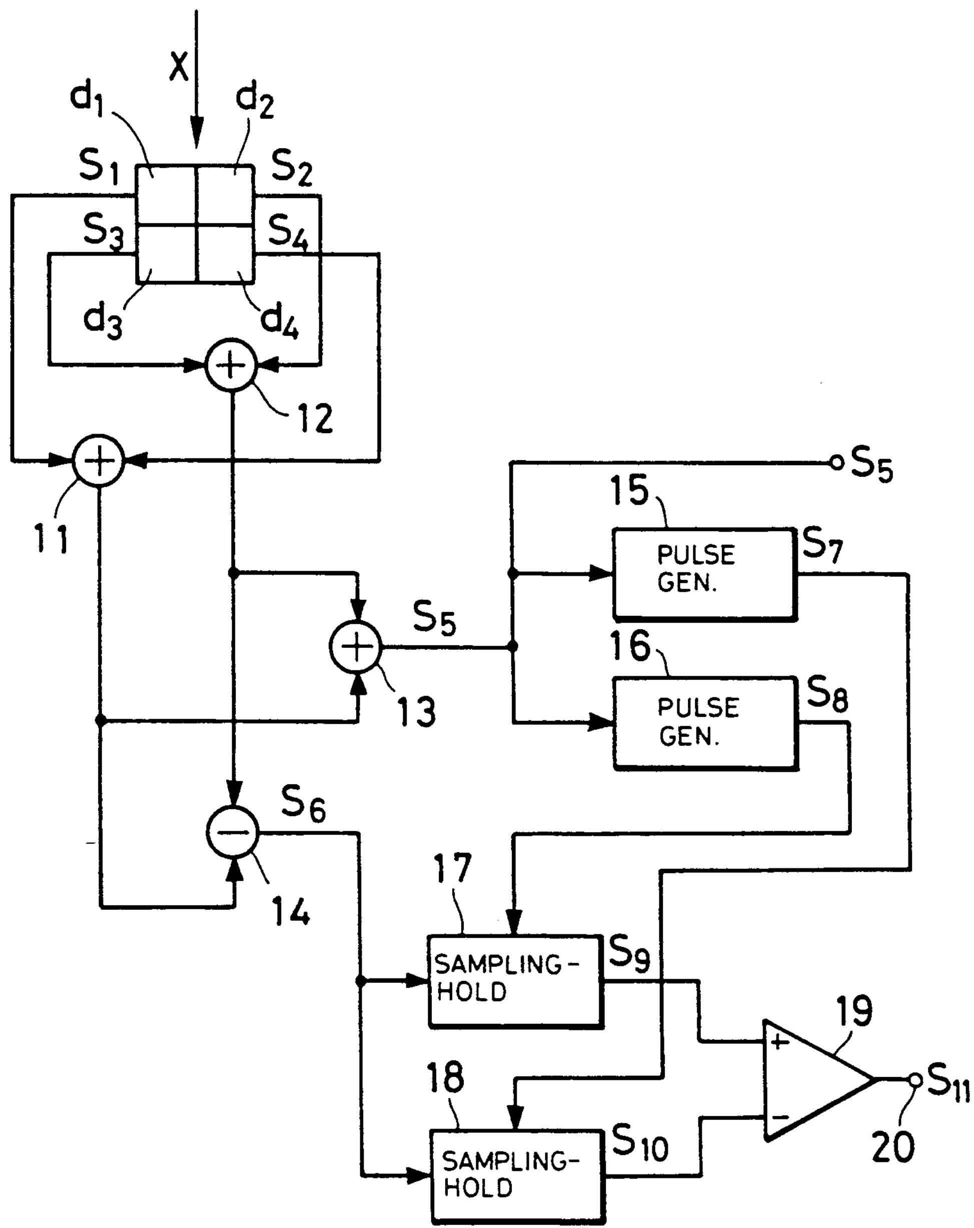
FIG. 3 is a block diagram showing a signal generating circuit connected with the photodetector shown in FIG. 1.
Figure 2C:
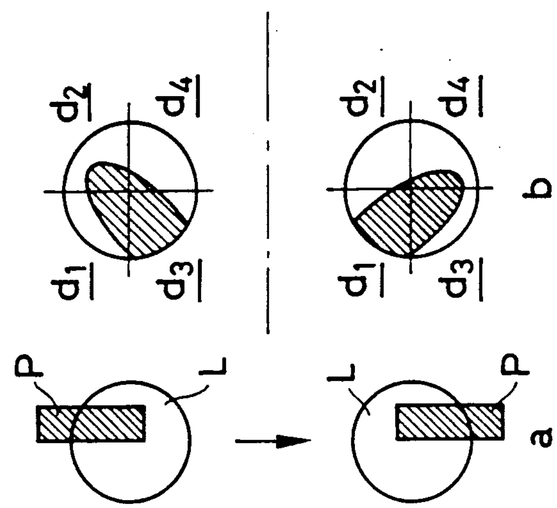
FIGS. 2A to 2C are a set of diagrams used for explaining the positional relationship between a pit forming a record track in a record medium and a beam spot formed by a light beam incident upon the record medium as known in the prior art.
Figure 2B:
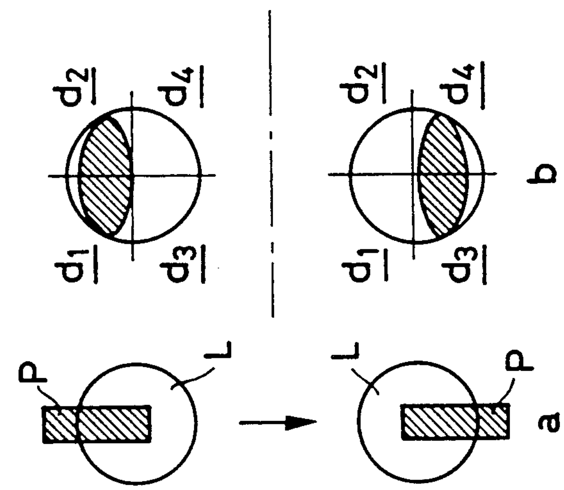
Figure 2A:
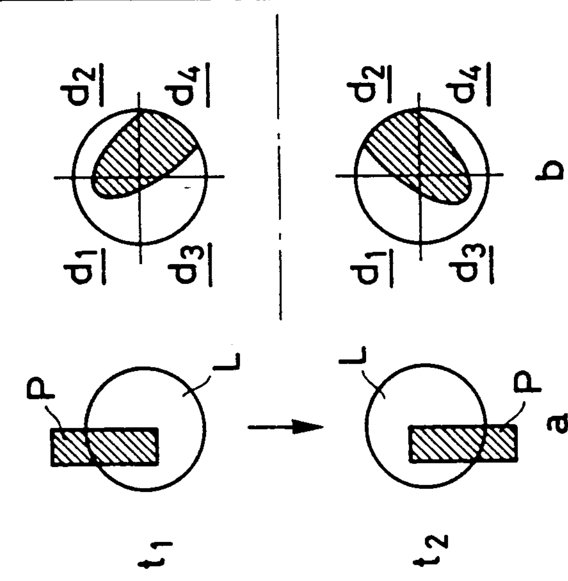
Figure 4:
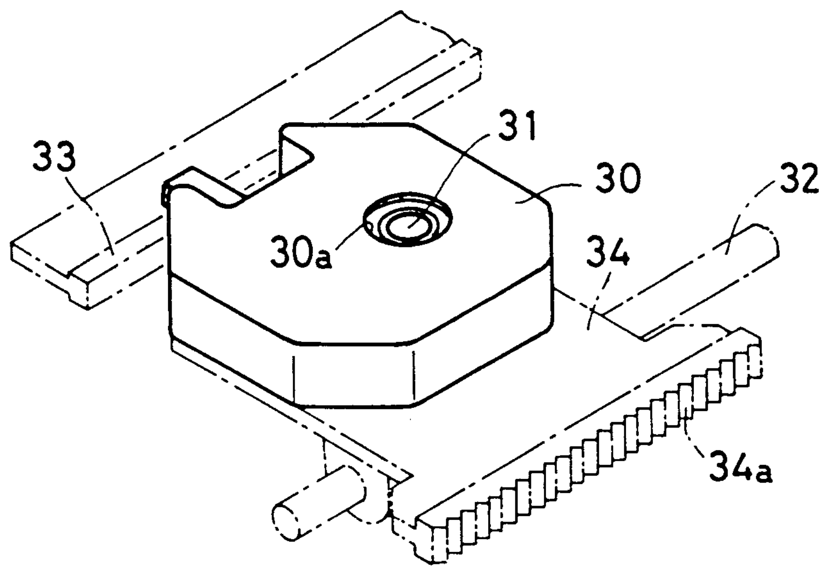
FIG. 4 is a schematic perspective view showing one embodiment of optical head device for use in recording and/or reproduction of information according to the present invention.

Referring to FIG. 4, the embodiment has a case 30 provided with an opening 30*a* to which an objective lens 31 contained in the case 30 faces. On the occasion of actual use in the disc player, the embodiment is mounted on the upper surface of a movable base member 34 which is engaged to be movable with guide members 32 and 33 provided in the disc player. The movable base member 34 is driven by a driving mechanism, which is provided in the disc player with a pinion engaging with a rack portion 34*a* formed on the movable base member 34 to be moved in a direction along the radius of an optical record disc mounted on the disc player under the guidance by the guide members 32 and 33.

The case 30 of the embodiment, contains a movable optical assembly including the objective lens 31 and a supporting and driving assembly operative to support the movable optical assembly and to move the same in predetermined directions.

Figure 5:
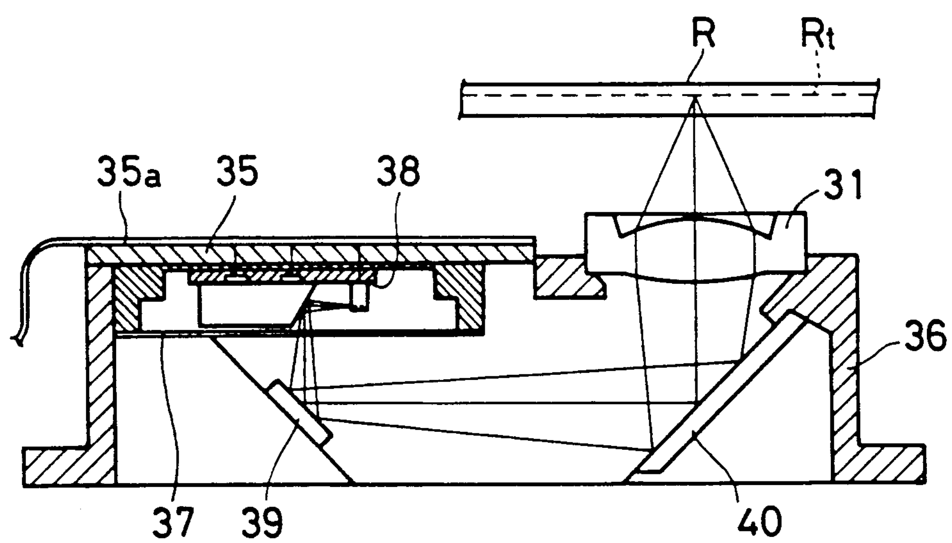
FIG. 5 is a cross-sectional view showing one example of a movable optical assembly employed in the embodiment shown on FIG. 4.

As shown in FIG. 5, the movable optical assembly has a supporting member 36 on which the objective lens 31 and an integrated element mounting board 35 are mounted. The integrated element mounting board 35 is provided with a flexible connecting film 35*a* extending therefrom.

In the supporting member 36, a package 37 which contains a light beam generating and detecting unit 38 is mounted on the inner surface of the integrated element mounting board 35. Further, a mirror 39 is held by the supporting member 36 to be disposed under the light beam generating and detecting unit 38, and another mirror 40 is also held by the supporting member 36 under the objective lens 31 to be disposed on the axis of the objective lens 31.

The movable optical assembly is disposed so as to cause the objective lens 31 mounted on the supporting member 36 to face the under surface of an optical record disc R. In the movable optical assembly thus disposed, the light beam generating and detecting unit 38 contained in the package 37 is operative to generate a laser light beam directed toward the mirror 39 which is positioned under the light beam generating and detecting unit 38. The laser light beam from the light beam generating and detecting unit 38 is reflected by the mirror 39 and then reflected further by the mirror 40 to be directed upward to enter the objective lens 31. The objective lens 31 is operative to focus the laser light beam from the mirror 40 on a record track Rt formed in the optical record disc R. Then, a reflected laser light beam obtained from the optical record disc R returns through the objective lens 31 to the mirror 40 to be reflected thereby. The reflected laser light beam reflected by the mirror 40 is further reflected by the mirror 39 to be directed upward to the light beam generating and detecting unit 38 contained in the package 37.

Figure 6:
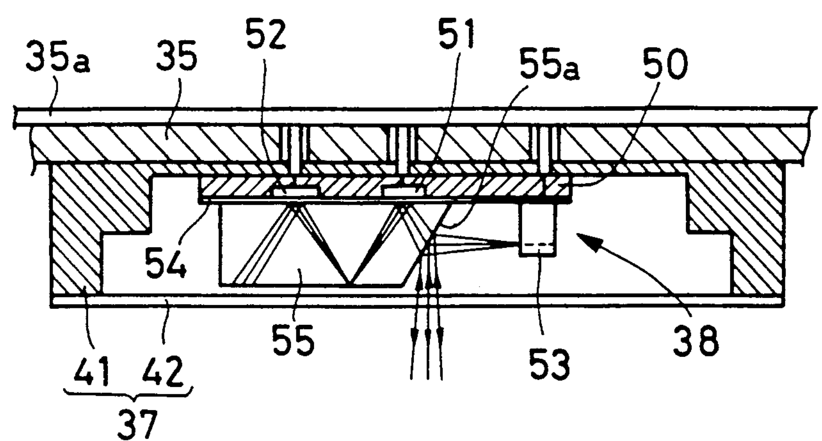
FIG. 6 is an enlarged cross-sectional view showing a light beam generating and detecting unit and a package containing the light beam generating and detecting unit, together with other optical elements, used in the movable optical assembly shown in FIG. 5.

As shown in FIG. 6 in which the light beam generating and detecting unit 38 contained in the package 37 is enlarged, the package 37 mounted on the inner surface of the integrated element mounting board 35 comprises a body 41 in which the light beam generating and detecting unit 38 is disposed and a glass plate member 42 attached to the body 41. The laser light beam generated by the light beam generating and detecting unit 38 passes through the glass plate member 42 to the mirror 39 and the reflected laser light beam reflected by the mirror 39 passes through the glass plate member 42 to the light beam generating and detecting unit 38.

In the light beam generating and detecting unit 38, as shown in FIG. 6, first and second photodetectors 51 and 52 are formed to align in a semiconductor substrate 50 so as to constitute a photodetecting portion. A semiconductor laser 53 is also provided on the surface of the semiconductor substrate 50. Further, a protective coating layer 54 is formed to cover the surface of the semiconductor substrate 50 except a portion thereof on which the semiconductor laser 53 is placed and a prism 55 is fixed on a portion of the protective coating layer 54 covering the photodetecting portion on the semiconductor substrate 50 whereon the first and second photodetectors 51 and 52 are formed. With such optical elements, the light beam generating and detecting unit 38 is integrated.

The prism 55 has a semi-transparent surface 55*a* which faces the semiconductor laser 53 and is inclined in relation to the surface of the semiconductor substrate 50 on which the semiconductor laser 53 is placed.

In the light beam generating and detecting unit 38 thus constituted, the laser light beam generated by the semiconductor laser 53 is reflected by the semi-transparent surface 55*a* of the prism 55 to pass through the glass plate member 42 toward the mirror 39. Then, the laser light beam from the semi-transparent surface 55*a* of the prism 55 is reflected twice by the mirrors 39 and 40 and caused to impinge upon the record track Rt in the optical record disc R through the objective lens 31. The reflected laser light beam obtained from the record track Rt in the optical record disc R returns through the objective lens 31 and is reflected twice by the mirrors 40 and 39. Then, the reflected laser light beam from the mirror 39 passes through the semi-transparent surface 55*a* of the prism 55 to enter the prism 55. In the prism 55, a part of the reflected laser light beam reaches to the first photodetector 51 and the rest of the reflected laser light beam is reflected to reach to the second photodetector 52. The reflected laser light beam is arranged to have a focusing point on an optical path formed between the first and second photodetectors 51 and 52 in the prism 55.

Figure 7:
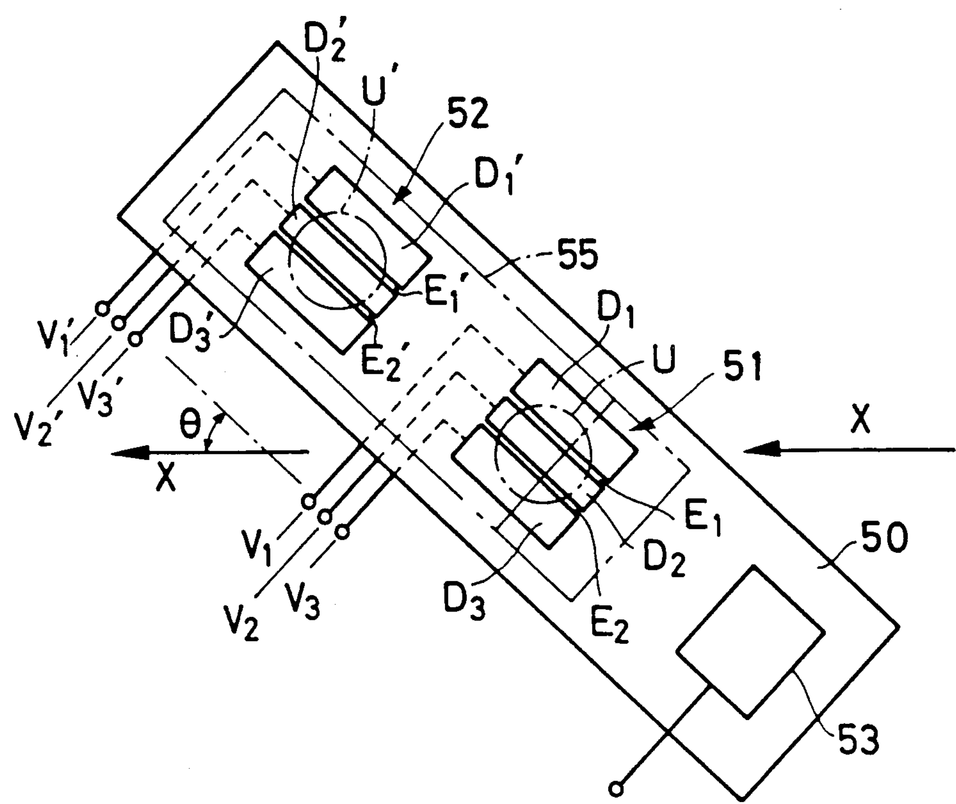
FIG. 7 is a schematic plan view of the light beam generating and detecting unit used in the movable optical assembly shown in FIG. 5.

As shown in FIG. 7, each of the first and second photodetectors 51 and 52 formed in the semiconductor substrate 50 comprises a group of photosensitive elements including a central photosensitive element and two side photosensitive elements facing each other with the central photosensitive element positioned therebetween. In more detail, the first photodetector 51 comprises three rectangular photosensitive elements $D_1$, $D_2$ and $D_3$ which are separated from each other by a couple of parallel dividing portions $E_1$ and $E_2$ so that the photosensitive element $D_2$ is positioned at the center and the photosensitive elements $D_1$ and $D_3$ are positioned at both sides of the photosensitive element $D_2$ and disposed to form a common light receiving plane, and similarly, the second photodetector 52 comprises three rectangular photosensitive elements $D_1'$, $D_2'$ and $D_3'$ which are separated from each other by a couple of parallel dividing portions $E_1'$ and $E_2'$ so that the photosensitive element $D_2'$ is positioned at the center and the photosensitive elements $D_1'$ and $D_3'$ are positioned at both sides of the photosensitive element $D_2'$ and disposed to form a common light receiving plane.

The semiconductor substrate 50, in which the first and second photodetectors 51 and 52 are formed in the above mentioned manner and on which the semiconductor laser 53 and the prism 55 are provided, is fixed to the inner surface of the body 41 of the package 37 in such a manner that a direction along which each of the parallel dividing portions $E_1$ and $E_2$ in the first photodetector 51 and the parallel dividing portions $E_1'$ and $E_2'$ in the second photodetector 52 extends is set to be at an angle $\theta$ within an angle range of 0 to 90 degrees, for example, 45 degrees to a direction corresponding to the tangential direction of the record track Rt in the optical record disc R, as indicated with arrows X in FIG. 7. Accordingly, each of the photosensitive elements $D_1$ to $D_3$ constituting the first photodetector 51 and the photosensitive elements $D_1'$ to $D_3'$ constituting the second photodetector 52 also extends to be at the angle $\theta$ to the direction corresponding to the tangential direction of the record track Rt in the optical record disc R indicated with the arrows X.

The part of the reflected laser light beam which comes from the record track Rt in the optical record disc R through the objective lens 31 to enter the prism 55 reaches the common light receiving plane formed by the photosensitive elements $D_1$ to $D_3$ constituting the first photodetector 51 and forms a beam spot U thereon as shown in FIG. 7 and another part of the reflected laser light beam reaches the common light receiving plane formed by the to photosensitive elements $D_1'$ to $D_3'$ constituting the second photodetector 52 and forms a beam spot U' thereon as shown in FIG. 7. The photosensitive elements $D_1$ to $D_3$ produce respective detection output signals $V_1$, $V_2$ and $V_3$ in response to portions of the beam spot U irradiating the photosensitive elements $D_1$ to $D_3$, respectively, and the photosensitive elements $D_1'$ to $D_3'$ produce respective detection output signals $V_1'$, $V_2'$ and $V_3'$ in response to portions of the beam spot U' irradiating the photosensitive elements $D_1'$ to $D_3'$, respectively. These detection output signals $V_1$ to $V_3$ and $V_1'$ to $V_3'$ are derived through the integrated element mounting board 35 and the flexible connecting film *35a* from the light beam generating and detecting unit 38.

The record track Rt in the optical record disc R is also composed of a series of pits having a depth which is a quarter of the wavelength of the laser light beam incident upon the record track Rt, and therefore the laser light beam impinging upon the record track Rt through the objective lens 31 is diffracted and reflected by the pits. Accordingly, the reflected light beam which returns through the objective lens 31 from the record track Rt in the optical record disc R and is guided to the first and second photodetectors 51 and 52 so as to form the beam spots U and U' on the photosensitive elements $D_1$ to $D_3$ and the photosensitive elements $D_1'$ to $D_3'$, respectively, produces a diffraction pattern in each of the beam spots U and U', which corresponds to the positional relationship between one of the pits forming the record track Rt and a beam spot formed by the laser light beam irradiating the record track Rt. The diffraction pattern thus produced in each of the beam spots U and U' is moved in the direction corresponding to the tangential direction of the record track Rt in the optical record disc R, as indicated with arrows X in FIG. 7, in relation to each of the first and second photodetectors 51 and 52 at speed corresponding to the movement of the record track Rt relative to the laser light beam irradiating the record track Rt.

Figure 8C:
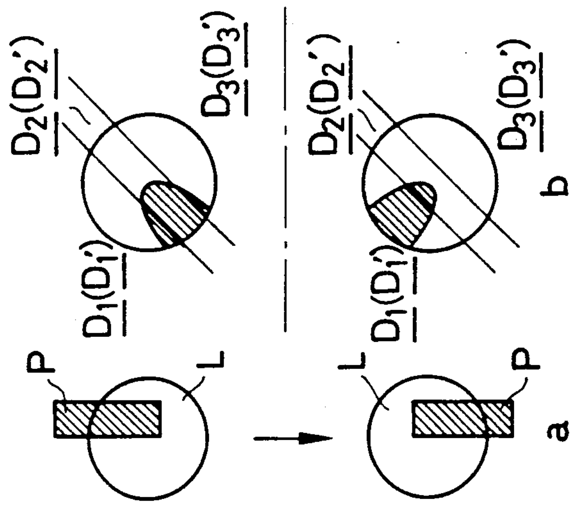
FIGS. 8A to 8C are a set of diagrams used for explaining the positional relationship between a pit forming a record track in a record medium and a beam spot formed by a light beam caused to impinge upon the record medium by the movable optical assembly shown in FIG. 5.
Figure 8B:
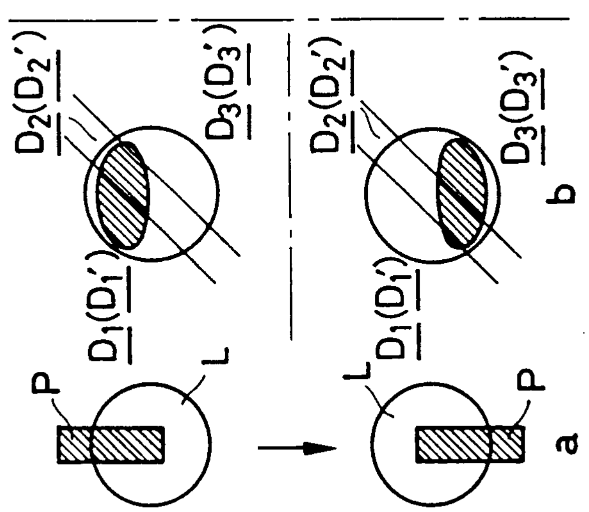
Figure 8A:
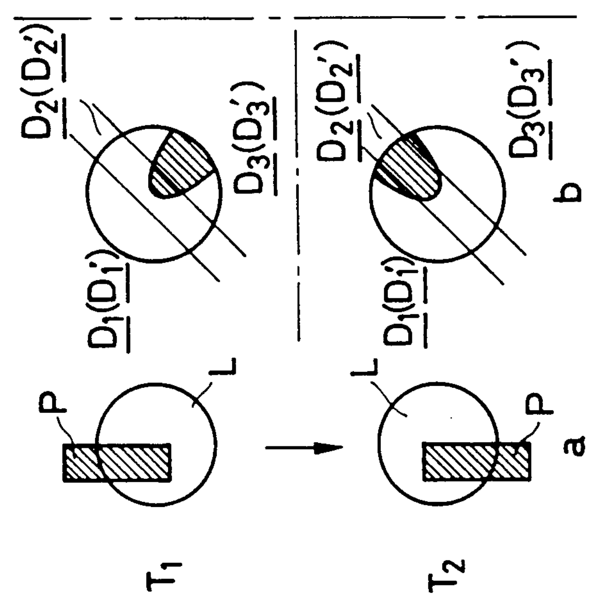

FIGS. 8A, 8B and 8C illustrate the manner in which the movement of the diffraction pattern mentioned above takes place. In each of FIGS. 8A to 8C, a designates positional relationships between a pit P and a beam spot L formed by the laser light beam irradiating the pit P, and b designates diffraction patterns (hatched portions) formed on an exit pupil surface of the objective lens 31 by the reflected laser light beam in dependence on each of the positional relationships designated by a. Three divided areas $D_1(D_1')$, $D_2(D_2')$ and $D_3(D_3')$ shown at b indicate portions in which quantities of light are detected by the photosensitive elements $D_1$ to $D_3$ constituting the first photodetector 51 and portions in which quantities of light are detected by the photosensitive elements $D_1'$ to $D_3'$ constituting the second photodetector 52. The pit P moves from a position $T_1$ to a position $T_2$ in relation to the beam spot L. FIG. 8A shows a condition in which the beam spot L is displaced to the right in relation to the pit P. FIG. 8B illustrates a condition in which the beam spot L is positioned centrally on the pit P, namely, a correct tracking condition in which the laser light beam arrives properly at the record track Rt in the optical record disc R. FIG. 8C shows a condition in which the beam spot L is displaced to the left in relation to the pit P.

It is understood from FIGS. 8A to 8C that when the beam spot L is centrally positioned on the pit P, that is, when the laser light beam incident upon the record track Rt is in the proper tracking condition, a diffraction pattern in which quantities of light are symmetrically distributed among the divided area $D_2(D_2')$ and a combination of the divided areas $D_1(D_1')$ and $D_3(D_3')$ is produced, and when the beam spot L is displaced rightward or leftward in relation to the pit P, a diffraction pattern in which no symmetric distribution of the quantities of light is obtained among the divided area $D_2(D_2')$ and the combination of the divided areas $D_1(D_1')$ and $D_3(D_3')$ is produced with the light distribution out of symmetry in reversed patterns in the case where the beam pattern is disposed to the right and in the case where the beam pattern is disposed to the left, respectively. Based on the foregoing, it is further understood that, by applying the detection output signals $V_1$, $V_2$ and $V_3$ obtained from the photosensitive elements $D_1$, $D_2$ and $D_3$, respectively, and the detection output signals $V_1'$, $V_2'$ and $V_3'$ obtained from the photosensitive elements $D_1'$, $D_2'$ and $D_3'$, respectively, to a signal generating circuit in which the detection output signal $V_2$ and a combination of the detection output signals $V_1$ and $V_3$ are processed separately and the detection output signal $V_2'$ and a combination of the detection output signals and $V_3'$ are also processed separately, a signal which varies in dependence on the positional relationships between the beam spot L and the pit P, namely, the tracking error signal can be obtained from the signal generating circuit.

Figure 9:
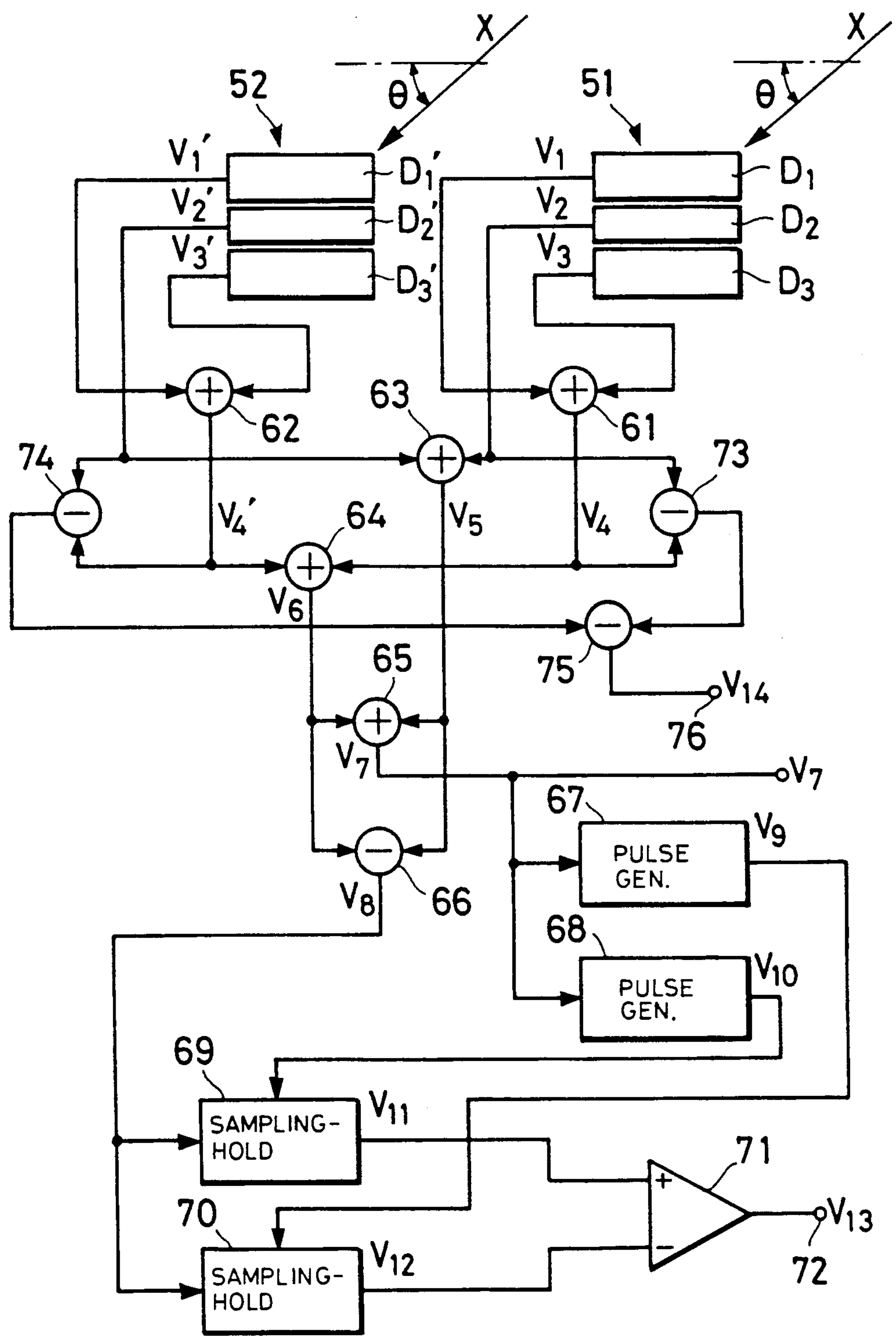
FIG. 9 is a block diagram showing a signal generating circuit connected with a photodetecting portion of the light beam generating and detecting unit used in the movable optical assembly shown in FIG. 5

FIG. 9 shows one example of the signal generating circuit by which the tracking error signal is produced based on the detection output signals $V_1$ to $V_3$ obtained from the photosensitive elements $D_1$ to $D_3$, respectively, and the detection output signals $V_1'$ to $V_3'$ obtained from the photosensitive elements $D_1'$ to $D_3'$, respectively, together with a reproduced output of an information signal recorded on the record track Rt in the optical record disc R, that is, a reproduced information signal and a focusing error signal.

The circuit shown in FIG. 9 is connected with the photosensitive elements $D_1$ to $D_3$ constituting the first photodetector 51, each of which extends tp be at the angle $\theta$ to the direction of movement of the diffraction pattern corresponding to the positional relationship between the pit P forming the record track Rt in the optical record disc R and the beam spot L formed by the laser light beam irradiating the record track Rt, as indicated by an arrow X close to the first photodetector 51, and also with the photosensitive elements $D_1'$ to $D_3'$ constituting the second photodetector 52, each of which extends to be at the angle $\theta$ to the direction of movement of the diffraction pattern, as indicated by an arrow X close to the second photodetector 52.

In the circuit shown in FIG. 9, the detection output signals $V_1$ and $V_3$ obtained from the photosensitive elements $D_1$ and $D_3$, respectively, are added to each other by an adder 61, the detection output signals $V_1'$ and $V_3'$ obtained from the photosensitive elements $D_1'$ and $D_3'$, respectively, are added to each other by an adder 62, and the detection output signal $V_2$ obtained from the photosensitive elements $D_2$ and the detection output signals $V_2'$ obtained from the photosensitive elements $D_2'$ are added to each other by an adder 63. Further, an output signal $V_4$ obtained from the adder 61 and an output signal $V_4'$ obtained from the adder 62 are added to each other by an adder 64.

Then, an output signal $V_5$ obtained from the adder 63 and an output signal $V_6$ obtained from the adder 64 are supplied to an adder 65 to produce an output signal $V_7$ and supplied also to a subtracter 66 to produce an output signal $V_8$. The output signal $V_7$ obtained from the adder 65 corresponds to the sum of the detection output signals $V_1$ to $V_3$ and $V_1'$ to $V_3'$ and therefore serves as the reproduced information signal. The output signal $V_8$ obtained from the subtracter 66 comprises a signal residing in a frequency band of the information signal recorded on the record track Rt in the optical record disc R and varying whenever the beam spot L on the optical record disc R passes through the pit P and serves as the tracking error signal which indicates deviations of the beam spot L on the optical record disc R from the center of the record track Rt formed by the series of pits P.

The detection output signal $V_2$ and the output signal $V_4$ obtained from the adder 61 are supplied to a subtracter 73, and the detection output signal $V_2'$ and the output signal $V_4'$ obtained from the adder 62 are supplied to a subtracter 74. Then, output signals obtained from the subtracters 73 and 74, respectively, are supplied to a subtracter 75 to produce an output signal $V_{14}$. This output signal $V_{14}$ varies in response to the focusing condition of the laser light beam incident upon the record track Rt in the optical record disc R and is delivered to an output terminal 76 as the focus error signal.

Further, in the circuit shown in FIG. 9, the output signal $V_7$ obtained from the adder 65 is supplied to pulse generators 67 and 68. The pulse generator 67 produces a pulse signal $V_9$ in response to each rising edge of the output signal $V_7$ and the pulse generator 68 produces a pulse signal $V_{10}$ in response to each falling edge of the output signal $V_7$. The output signal $V_8$ obtained from the subtracter 66 is supplied to both of sampling-hold circuits 69 and 70. In the sampling-hold circuit 69, the level of the output signal $V_8$ is sampled by the pulse signal $V_{10}$ and each level sampled by pulse signal $V_{10}$ is held to produce an output signal $V_{11}$. Similarly, in the sampling-hold circuit 70, the level of the output signal $V_8$ is sampled by the pulse signal $V_9$ and each level sampled by pulse signal $V_9$ is held to produce an output signal $V_{12}$. Each of the output signals $V_{11}$ and $V_{12}$ obtained from the sampling-hold circuits 69 and 70, respectively, has a polarity varying from negative to positive or vice versa when the beam spot L formed on the optical record disc R is moved to traverse the record track Rt and a level representative of the deviations of the beam spot L from the center of the record track Rt. Consequently, the output signals $V_{11}$ and $V_{12}$ can be employed as tracking control signals. These output signals $V_{11}$ and $V_{12}$ are supplied to a differential circuit 71 to produce a tracking control signal $V_{13}$ which is more reliable and is then delivered to an output terminal 72.

Although, in the embodiment described above, both the detection output signal $V_2$ from the photosensitive element $D_2$ and the combined signal obtained by adding the detection output signals $V_1$ and $V_3$ from the photosensitive elements $D_1$ and $D_3$, which are derived from the first photodetector 51, and the detection output signal $V_2'$ from the photosensitive element $D_2'$ and the combined signal obtained by adding the detection output signals $V_1'$ and $V_3'$ from the photosensitive elements $D_1'$ and $D_3'$, which are derived from the second photodetector 52, are used for producing the output signal $V_8$ which serves as the tracking error signal, it is possible to use either the detection output signal $V_2$ and the combined signal obtained by adding the detection output signals $V_1$ and $V_3$, which are derived from the first photodetector 51, or the detection output signal $V_2'$ and the combined signal obtained by adding the detection output signals $V_1'$ and $V_3'$, which are derived from the second photodetector 52, for producing the tracking error signal.

What is claimed is:

1. An optical head device for use in recording and/or reproduction of information comprising:

light beam generating means, lens means for causing a light beam obtained from said light beam generating means to impinge upon a record medium and for receiving a reflected light beam from the recording medium, and photodetecting means to which said reflected light beam received by said lens means is guided, said photodetecting means comprising a group of photosensitive elements including a central and two side photosensitive elements separated from each other by respective parallel dividing portions each extending along a predetermined direction, said group of photosensitive elements being disposed to form a common light receiving plane on which a single beam spot is formed by said reflected light beam for detecting said reflected light beam and for producing respective detection output signals corresponding to said central photosensitive element and an added signal obtained by adding the detection output signals corresponding to said side photosensitive elements to each other, said parallel dividing portions each being of a width substantially less than the size of said single beam spot formed on said common light receiving plane, and said predetermined direction along which each of said parallel dividing portions extends being selected to be at a non-zero angle less than 90 degrees relative to a direction of movement of a diffraction pattern appearing in said single beam spot formed on said common light receiving plane in response to the record track in said record medium.

2. An optical head device according to claim 1, wherein said photodetecting means further comprises a second group of photosensitive elements including a central and two side photosensitive elements separated from each other by respective parallel dividing portions each extending along said predetermined direction, said second group of photosensitive elements being disposed to form a second common light receiving plane on which a second single beam spot is formed by said reflected light beam guided to said photodetecting means for detecting said reflected light beam and for producing respective second detection output signals, and said reflected light beam guided to said photodetecting means is caused to be incident upon the first group of photosensitive elements and said second group of photosensitive elements successively with a focusing point thereof on an optical path formed between said first group of photosensitive elements and said second group of photosensitive elements.

3. An optical head device according to claim 1, wherein said photodetecting means is coupled with signal generating means receiving said detection output signals and for producing a signal based on a difference between said detection output signal corresponding to said central photosensitive element and said added signal obtained by adding said detection output signals corresponding to said side photosensitive elements to each other.

4. An optical head device according to claim 2, wherein said photodetecting means is coupled with signal generating means receiving said detection output signals and for producing a signal based on a difference between an added signal obtained by adding the detection output signal corresponding to said central photosensitive element of said first group of photosensitive elements and the detection output signal corresponding to said central photosensitive element of said second group of photosensitive elements to each other and an added signal obtained by summing the detection output signals corresponding to said side photosensitive elements of said first group of photosensitive elements and the detection output signals corresponding to said side photosensitive elements of said second group of photosensitive elements.

5. An optical head device according to claim 2, wherein said photodetecting means further comprises a semiconductor substrate in which said first group of photosensitive elements and said second group of photosensitive elements are formed and aligned in said predetermined direction and an optical element disposed on said semiconductor substrate for guiding said reflected laser light beam to said first group of photosensitive elements and to said second group of photosensitive elements.

6. An optical head device according to claim 1, wherein said predetermined direction along which each of said parallel dividing portions extends is selected to be substantially at an angle of 45 degrees to the direction of movement of said diffraction pattern appearing in said beam spot formed on said common light receiving plane in response to the record track in said record medium.

* * * * *